US012763063B2

(12) United States Patent
Miseikis

(10) Patent No.: US 12,763,063 B2
(45) Date of Patent: Oct. 13, 2026

(54) INFORMATION PROCESSING DEVICE AND INFORMATION PROCESSING METHOD FOR ARTIFICIAL SPEECH GENERATION

(71) Applicant: Sony Group Corporation, Tokyo (JP)

(72) Inventor: Justinas Miseikis, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 168 days.

(21) Appl. No.: 18/404,943

(22) Filed: Jan. 5, 2024

(65) Prior Publication Data

US 2024/0242703 A1 Jul. 18, 2024

(30) Foreign Application Priority Data

Jan. 12, 2023 (EP) .................................... 23151301

(51) Int. Cl.

| | |
|---|---|
| ***G10L 13/027*** | (2013.01) |
| ***G10L 13/033*** | (2013.01) |
| ***G10L 25/30*** | (2013.01) |
| ***G10L 25/63*** | (2013.01) |

(52) U.S. Cl.

CPC .......... *G10L 13/027* (2013.01); *G10L 13/033* (2013.01); *G10L 25/30* (2013.01); *G10L 25/63* (2013.01)

(58) Field of Classification Search

CPC ....... G10L 25/63; G10L 25/30; G10L 13/027; G10L 13/033

See application file for complete search history.

(56) References Cited

U.S. PATENT DOCUMENTS

| | | | | |
|---|---|---|---|---|
| 11,545,134 | B1 * | 1/2023 | Federico | G10L 13/033 |
| 2008/0288257 | A1 | 11/2008 | Eide | |
| 2016/0078859 | A1 | 3/2016 | Luan et al. | |
| 2018/0077095 | A1 * | 3/2018 | Deyle | G06T 13/205 |
| 2020/0082806 | A1 * | 3/2020 | Kim | G06N 3/045 |
| 2020/0082807 | A1 | 3/2020 | Kim et al. | |
| 2020/0388270 | A1 * | 12/2020 | Candelore | G10L 15/16 |
| 2021/0352380 | A1 * | 11/2021 | Duncan | H04N 21/4884 |
| 2021/0366462 | A1 | 11/2021 | Yang et al. | |
| 2021/0407510 | A1 * | 12/2021 | Wang | G10L 25/78 |
| 2022/0358905 | A1 * | 11/2022 | Gupta | G06F 40/42 |
| 2023/0377607 | A1 * | 11/2023 | Bonnie | G10L 13/0335 |

(Continued)

FOREIGN PATENT DOCUMENTS

| | | | |
|---|---|---|---|
| KR | 10-2035596 | B1 | 10/2019 |
| KR | 2022-0023381 | A | 3/2022 |
| WO | 2021/212954 | A1 | 10/2021 |

OTHER PUBLICATIONS

Shi et al., "Learning audio-visual speech representation by masked multimodal cluster prediction." arXiv preprint arXiv:2201.02184 (Year: 2022).*

(Continued)

*Primary Examiner* — Samuel G Neway
(74) *Attorney, Agent, or Firm* — XSENSUS LLP

(57) ABSTRACT

An information processing device for generating artificial speech data has circuitry which is configured to obtain, based on speech data, speech emotional indicators and associated timing data of the emotional indicators; and to obtain, based on the speech data, text data; and to generate artificial speech data based on the text data, the speech emotional indicators and the associated timing data.

18 Claims, 6 Drawing Sheets

(56) References Cited

U.S. PATENT DOCUMENTS

| | | | | |
|---|---|---|---|---|
| 2023/0386475 | A1* | 11/2023 | Frenzel | G10L 17/04 |
| 2024/0242703 | A1* | 7/2024 | Miseikis | G10L 13/033 |

OTHER PUBLICATIONS

Mohamed Osman, "Emo-Tts:Parallel Transformer-based Text-to-Speech Model with Emotional Awareness", IEEE, Available Online at: https://ieeexplore.ieee.org/document/9756092, Mar. 9-10, 2022, pp. 1-3.

Chen et al., "V2C: Visual Voice Cloning", arXiv:2111.12890v1 [cs.CV], Nov. 25, 2021, pp. 1-15.

* cited by examiner

INFORMATION PROCESSING DEVICE AND INFORMATION PROCESSING METHOD FOR ARTIFICIAL SPEECH GENERATION

CROSS-REFERENCE TO RELATED APPLICATION

This application is based upon and claims the benefit of priority of the prior European Patent Application No. 23151301.1, filed on Jan. 12, 2023, the entire contents of which are incorporated herein by reference.

TECHNICAL FIELD

The present disclosure generally pertains to an information processing device and an information processing method for artificial speech generation including emotional features.

TECHNICAL BACKGROUND

In text-to-speech conversion it is known to artificially generate speech based on an input text.

For instance, this is used for voice cloning purposes, wherein the generated voice is based on an already existing template voice, or also for translation application purposes, wherein a user inputs a text that is translated into speech in a foreign language.

Additionally, human speech contains not only the spoken content itself but also carries an emotional component that may enable a listener to infer various implicit information about the speaker as well as the content of the speech.

Although there exist techniques for artificial speech generation, it is generally desirable to improve devices and methods for generating artificial speech.

SUMMARY

According to a first aspect, the present disclosure provides an information processing device including circuitry configured to obtain, based on speech data, speech emotional indicators and associated timing data of the emotional indicators; obtain, based on the speech data, text data; generate artificial speech data based on the text data, the speech emotional indicators and the associated timing data.

According to a second aspect, the present disclosure provides an information processing method including obtaining, based on speech data, speech emotional indicators and associated timing data of the emotional indicators; obtaining, based on the speech data, text data; generating artificial speech data based on the text data, the speech emotional indicators and the associated timing data.

Further aspects of the present disclosure are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 1:
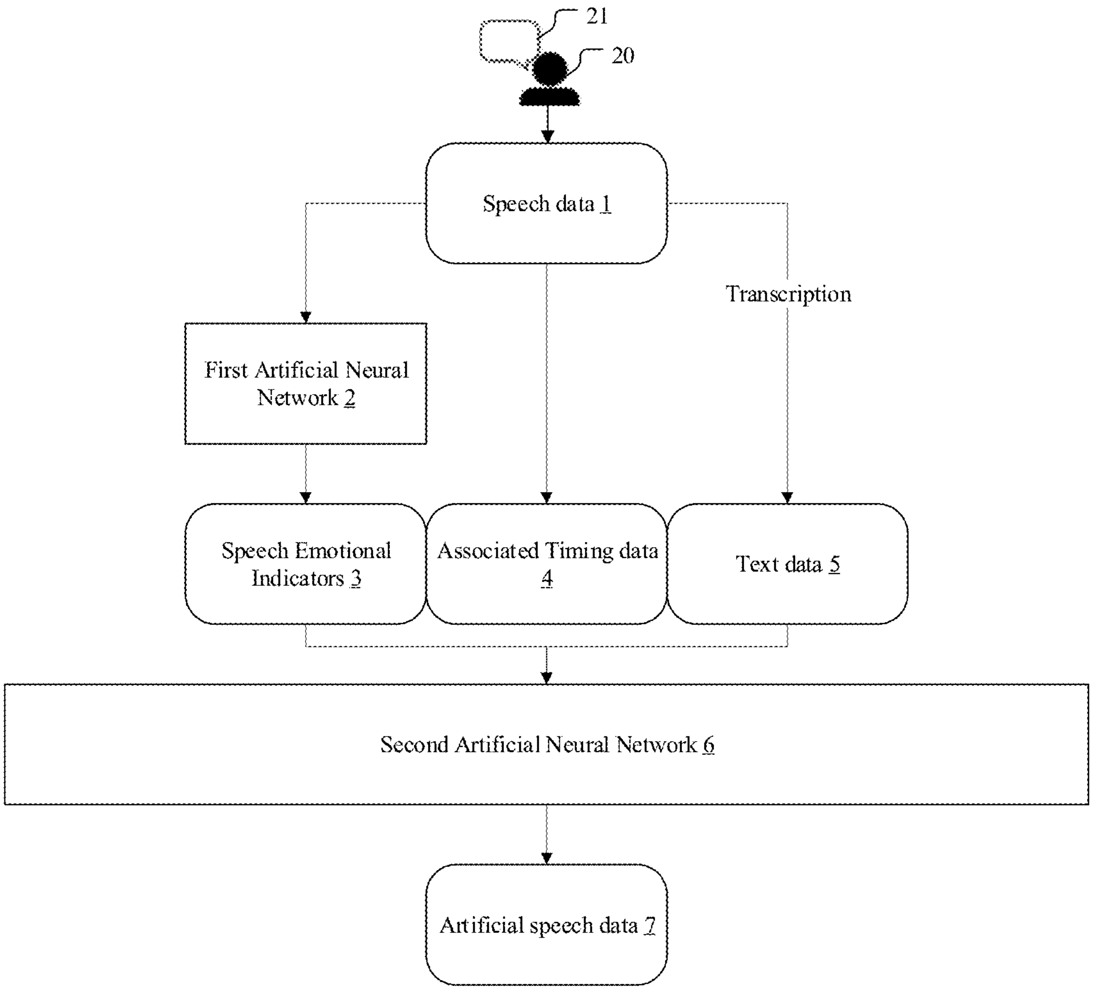
FIG. 1 is a diagram illustrating an embodiment to generate artificial speech data including emotional features which is implemented in an embodiment of an information processing device.

Before a detailed description of the embodiments under reference of FIG. 1 is given, general explanations are made.

As mentioned in the outset, generally, text-to-speech conversion for generating artificial speech is known, which is used, for example, for voice cloning. However, it has been recognized that real human speech may carry a significant emotional component which is necessary for communication. Therefore, to simulate realistic human speech infusing a generated artificial speech with emotion might be useful. It has been recognized that to make artificial speech sound more natural, including emotional features into the artificial speech in a way that it simulates human speech and carries realistic emotional content, may be an important and difficult endeavor in some instances.

Artificial intelligence (AI)-based video transcription and text-to-speech (TTS) systems may enable automatic translation of any audio in a video to another language. It has been recognized that the automatically generated TTS systems do not convey the emotion of the character well, in some instances, which may make the synthesized voice perceive unrealistic and robotic to a listener.

In some embodiments, videos, movies, video clips, the original voice and audio of the speaking person or character may carry significant emotion-based information which can be observed both in the audio and in the video signal. Generally, there exist separate algorithms which analyze emotion information of voice and of a video sequence containing a person of interest.

In contrast to merely relying on a text as a basis for generating the artificial speech, some embodiments pertain to the idea of using information that carries an emotional component as a basis for generating the artificial speech. In some embodiments, this can be achieved by using text transcription, audio and visual analysis (if a character is clearly visible) of a person or character in the video to improve realistic generation of text-to-speech synthetic generation for voice synthesis, voice cloning or foreign language dubbing. Emotion detection allows in some embodiments to embed the emotional information of the character to improve the realism compared to the current automatic text-to-speech and synthetic dubbing of a character.

Consequently, some embodiments pertain to an information processing device that includes a circuitry configured to obtain, based on speech data, speech emotional indicators and associated timing data of the emotional indicators; obtain, based on the speech data, text data; generate artificial speech data based on the text data, the speech emotional indicators and the associated timing data.

The information processing device may be a smartphone, a laptop computer, a tablet computer, a personal computer, a wearable electronic device, electronic glasses, or the like.

The circuitry may include one or more processors, logical circuits, memory (read only memory, random memory, etc., storage, e.g., hard disk, compact disc, flash drive, etc.), an interface for (wireless, e.g., Bluetooth, infrared) communication via a network (local area network, wireless network, internet). Moreover, it may include input means (mouse, keyboard, microphone, camera etc.), output means (loudspeakers, display (e.g., liquid crystal, (organic) light emitting diode, etc.)), and sensors for sensing audio data (microphone), still image or video image data (image sensor, camera sensor, video sensor, etc.).

The speech data may be based on natural human speech and may be based on audio recordings of human speech, whereby the speech data are obtained, for example by analog-to-digital conversion of an analog speech (sound) signal. The speech data may also be obtained by extracting them from digital audio data. Generally, the speech data may be obtained from any source.

The text data are based on speech data as mentioned above. The text data may be obtained, for example, via the interface, from a memory, from inside the device or from outside, etc. The text data may also be generated by the device, for example. In the latter case, the speech data, on which the text data are based, may be obtained by the device, for example, via the interface, from a memory, from inside the device or from outside, etc.

The text data may be generated by making a text transcription of speech on which the speech data are based or may be based on a translation of the speech in a different language, as is the case for subtitles, for example. The translation may be based on a translation of the text transcribed from the speech. Thus, the artificial speech generated based on the translated text may be in a different language. The text transcription or the translation may be obtained, for example, via the interface, from a memory, from inside the device or from outside, etc. The text transcription or translation may also be generated by the device, for example. In the latter case, the speech data, on which the transcription or translation are based, may be obtained by the device, for example, via the interface, from a memory, from inside the device or from outside, etc.

Speech emotional indicators are based on the speech data as mentioned above, which is the speech data on which also the text data is based. The speech emotional indicators may be provided in the form of digital data, e.g. in a data file, as values in a vector, as values of a function or in any other format which is suitable for digital processing.

The speech emotional indicators may be obtained, for example, via the interface, from a memory, from inside the device or from outside, etc. The speech emotional indicators may also be generated by the device, for example. In the latter case, the speech data, on which the speech emotional indicators are based, may be obtained by the device, for example, via the interface, from a memory, from inside the device or from outside, etc.

The associated timing data are associated with the speech emotional indicators and are based on the speech data. The associated timing data may be obtained, for example, via the interface, from a memory, from inside the device or from outside, etc. The associated timing data may also be generated by the device, for example. In the latter case, the speech data, on which the associated timing data are based, may be obtained by the device, for example, via the interface, from a memory, from inside the device or from outside, etc.

The generation of the artificial speech data may be based on a trained speech generation model. The trained model may include, for example, acoustic parameters as well as text parameters, wherein the acoustic parameters are associated with the text parameters. Furthermore, the model may include emotional parameters associated with the acoustic parameters. The model may be a machine learning algorithm and may for example, be based on a support vector machine (SVM), an artificial neural network, e.g., a convolutional neural network (CNN) or multimodal AI model, e.g., transformer model, or the like.

The machine learning algorithm of the speech generation model may be trained in advance. For example, emotional speech may be used for training the learning algorithm. The emotional speech may be marked based on emotional speech markers for training the learning algorithm, such markers may be one or more of inferred emotion, speech tempo, speech pause, emotional pause (e.g., breathing, sigh, etc.), speech pitch, speech rhythm. Furthermore, text transcribed from emotional speech or translated from emotional speech may be used for training the learning algorithm.

The artificial speech data generated may include acoustic features such as phoneme sequence, sound frequency information, waveform, time, amplitude, spectrographic information of sound and the like.

Based on the artificial speech data an artificial speech may be synthesized. The device may be configured to synthesize the artificial speech from the speech data or the artificial speech may be synthesized outside of the device. The artificial speech may be transmitted via the loudspeakers of the device.

The text data as well as the speech emotional indicators may be input into the trained model (e.g. trained machine learning algorithm as mentioned above). However, the trained model may include acoustic features of other voices different from the voice of the speech on which the speech emotional indicators and the text are based. The artificial speech that may be generated from the artificial speech data generated by the model may thus be the same speech on which the speech emotional indicators and the text are based but spoken in a different voice or in a different language or both, the latter if the text data is based on a language translation of the speech.

The speech emotional indicators may be associated with the text data based on the associated timing data, and the generation of the artificial speech may be based on the speech emotional indicators associated with the text data. The associated timing data may be indicative of time intervals or timestamps that fall into certain intervals. Hence, in some embodiments the speech emotional indicators are mapped, for example, to words represented by the text data, to pauses between words, text passages, syllables, complete sentences, etc., represented by the text data.

The speech emotional indicators may be extracted from the speech data which is based on speech and during the extraction process the speech emotional indicators may be tagged with a timestamp or associated with a time interval that is based on the timestamps or time intervals of the speech on which the speech data is based.

Similarly, the text data may be based on text transcribed from the same speech the emotional indicators are extracted from and certain linguistic features, such as sentences, words, syllables, letters or phonemes that are found in the speech and in the text and may be tagged in the text with a timestamp or associated with a time interval based on the timestamp or time interval when the same linguistic features appear in the speech.

On that basis text data based on the transcribed text may be associated with associated timing data. Thus, the emotional indicators and text data may be associated by their time intervals or by timestamps that fall into the same time intervals. In this way, the emotional indicators may be matched precisely to the timestamps of the speech transcription to ensure that the encoded features of the emotional speech indicators will be matching the artificial speech that is generated.

The speech emotional indicators may be obtained based on speech indicators of the speech data and may be at least one of: inferred emotion, speech tempo, speech pause, emotional pause (e.g., breathing, sigh, etc.), speech pitch and speech rhythm. Thus, the emotional indicators may be speech indicators also associated with emotions.

The speech emotional indicators may be obtained based on a trained emotion encoding model, such as, for example, a machine learning algorithm and may for example, be based on a support vector machine (SVM) or an artificial neural network, e.g., a convolutional neural network (CNN) or multimodal AI model, e.g., transformer model, or the like. The emotion encoding model may be configured to determine the speech emotional indicators from the speech data.

As mentioned above, the emotional indicators may be speech indicators also associated with emotions. Thus, the emotion encoding model may be configured to encode the speech emotional indicators based on the speech indicators. The emotion encoding model may be further configured to also encode speech indicators from speech data. The speech indicators may be the basis for determining the speech emotional indicators. However, speech indicators may be encoded separate from the speech emotional indicators.

Furthermore, the generation of the artificial speech data may be based not only on text data and speech emotional indicators, but also on speech indicators not encoded within the speech emotional indicators. The speech indicators may be used to generate the acoustic features of the artificial speech data. Thus, an artificial speech generated from such artificial speech data may be generated in the same voice as the voice the speech data is based on, on which the speech emotional indicators and the text data are also based in turn. Therefore, voice cloning may be achieved. In combination with a text translation as a basis of the text data, voice cloning in combination with language translation may be achieved.

The emotion encoding model may be trained in advance. For example, emotional speech may be used for training the learning model. The emotional speech may be marked based on emotional speech markers for training the learning algorithm, such markers may be one or more of inferred emotion, speech tempo, speech pause, emotional pause (e.g., breathing, sigh, etc.), speech pitch, speech rhythm.

In some embodiments, the circuitry may be further configured to obtain, based on video data associated with the speech data, video emotional indicators and the generation of the artificial speech data may be further based in the video emotional indicators.

Video emotional indicators may be based on visual indicators or may be visual indicators associated with emotion and may be at least one of: facial expressions (e.g., smile, frown), eye direction (straight, side shift, etc.), gestures (dynamics of motions, semantically meaningful gestures, self-touch, etc.), body pose. The video emotional indicators may be provided in the form of digital data, e.g. in a data file, in a data vector, as values of a function, etc., or any other form that is suitable for digital processing.

The speech emotional indicators and the video emotional indicators may be associated to each other, based on associated timing data. The association may be based on time intervals or semantic grouping of the visual indicators of the video data and the speech indicators of the speech data. For example, if a speaker says a certain word and smiles in the same time interval.

Thus, to generate the same speech in a different voice or a different language, or both, text, audio and video may be used as input. Based on the analysis of the audio and video, inferred emotion, speech tempo and pauses, emotional pauses (breathing, sighs, etc.), speech pitch and rhythm may be encoded. Furthermore, artificial neural networks may be used, for example, multimodal AI models, e.g., transformer models, or the like, as also mentioned above.

The speech data may be captured of a speaker or of multiple speakers. Similarly, the video data may be captured of a speaker or multiple speakers. If the speech data is captured of multiple speakers the emotional indicators may be obtained associated with each speaker based on the video data and the generation of the artificial speech may be based on the speech emotional indicators associated with one speaker of the multiple speakers.

Therefore, the audio data, which is, for example, the speech data, and the video data may be matched together from the input to assign each audio signal to each of the visual speakers during the analysis of the source data. Transcription of the speech (either provided or transcribed from audio) would be used as a base of generating the new voice of the person or character in the video. The new voice may be used for voice cloning over the same speech, translation to other languages or dialects or any other adaptation necessary for the given application.

The video emotional indicators may be obtained based on a trained visual emotion encoding model, such as, for example, a machine learning algorithm and may for example, be based on a support vector machine (SVM), an artificial neural network, e.g., a convolutional neural network (CNN) or multimodal AI model, e.g., transformer model, or the like. The visual emotion encoding model may be configured to determine the video emotional indicators from the video data.

As mentioned above, the video emotional indicators may be visual indicators also associated with emotions. Thus, the visual emotion encoding model may be configured to encode the visual emotional indicators based on the visual indicators.

In some embodiments, as also mentioned above, the existing audio and visual information, for example, the visual indicators of the video data and the speech indicators of the speech data, may be encoded using trained models, for example, artificial neural networks, into the single or synchronized latent feature space and may be the basis of encoding the emotions and speech parameters, for example, the speech emotional indicators, for generating the new speech. This may be matched precisely to the timestamps of the speech transcription, on which, for example, the text data as further input into the generation process, is based, to ensure that latent space encoding is matching temporally the new speech that is being generated, based on, for example, generated artificial speech data. TTS, or synthetic speech generation may take the encoded latent space of the original audio and video inputs, for example, the speech data and the video data, as well as the transcription of the matched scene and use artificial neural networks to generate new emotion-driven speech of the given speaker even when using significantly different voice or even different language.

In some embodiments, the circuitry may be further configured to synchronize the artificial speech data to visual indicators, wherein the visual indicators may be lip movements, and the synchronization includes synchronizing the lip movements to the artificial speech data. Thus, additionally, visual lip syncing may be added to match the visual movements of the mouth to the newly generated voice. Lip syncing may also be generated using AI by capturing the face and newly generated audio or speech and adjusting the visual lip movements in a realistic manner to match the exact sounds of the audio track. In some embodiment, lip syncing may be generated for speech data and video data captured of multiple characters or speakers. If that is the case the voice or audio analysis of the speech data and the visual analysis of the video data is isolated in the source for every character or speaker.

Some embodiments pertain to an information processing method for generating artificial speech data, which may be performed by the information processing device described herein, any other electronic device or a processor or other computing means. The method includes obtaining, based on speech data, speech emotional indicators and associated timing data of the emotional indicators; and obtaining, based on the speech data, text data; and generating artificial speech data based on the text data, the speech emotional indicators and the associated timing data. As mentioned, the speech emotional indicators are associated with the text data based on the associated timing data, and wherein the generation of the artificial speech data is based on the speech emotional indicators associated with the text data. The associated timing data may be indicative of time intervals or timestamps. The speech emotional indicators may be obtained based on speech indicators of the speech data and may be at least one of: inferred emotion, speech tempo, speech pause, emotional pause, speech pitch, speech rhythm. Obtaining the speech emotional indicators may be further based on an artificial neural network, which may be configured to determine the speech emotional indicators based on the speech data.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, a method or processing scheme to generate artificial speech data including emotional features is illustrated. Speech data 1, which is audio data, of a speaker 20 is captured and provided to a first artificial neural network (ANN) 2. The first ANN 2 extracts speech emotional indicators 3 from the speech data 1. Based on the speech 21 of the speech data 1 a transcription of the speech 21 into text and thus text data 5 is generated. Based on the speech data 1 also associated timing data 4 is extracted and associated with the speech emotional indicators 3 as well as the text data 5. The speech emotional indicators 3 are associated with the text data 5 based on the associated timing data 4 and provided to a second artificial neural network 6. Based on the speech emotional indicators 3 and the text data 5 associated with each other via the associated timing data 4, the artificial speech data 7 is generated. Thus, as the artificial speech data 1 is based on speech emotional indicators 3, the artificial speech data 7 also includes an emotional component carried within its acoustic features.

The running of the second artificial neural network 6 can be executed by a circuitry of an information processing device (see 120, FIG. 4) configured to generate the artificial speech data 7. The second artificial neural network 6 may be implemented in one or more processors of the circuitry, e.g., processors such as the CPU 121 of FIG. 4.

Based on the artificial speech data 7 an artificial speech may be generated that carries an emotional component. The artificial speech may reproduce the speech 21 of the original speaker 20 in a different voice or if the text data 4 is based on a language translation of the speech 21, the artificial speech may reproduce the speech 21 of the original speaker 20 in a different language or even a different language and a different voice.

Figure 2:
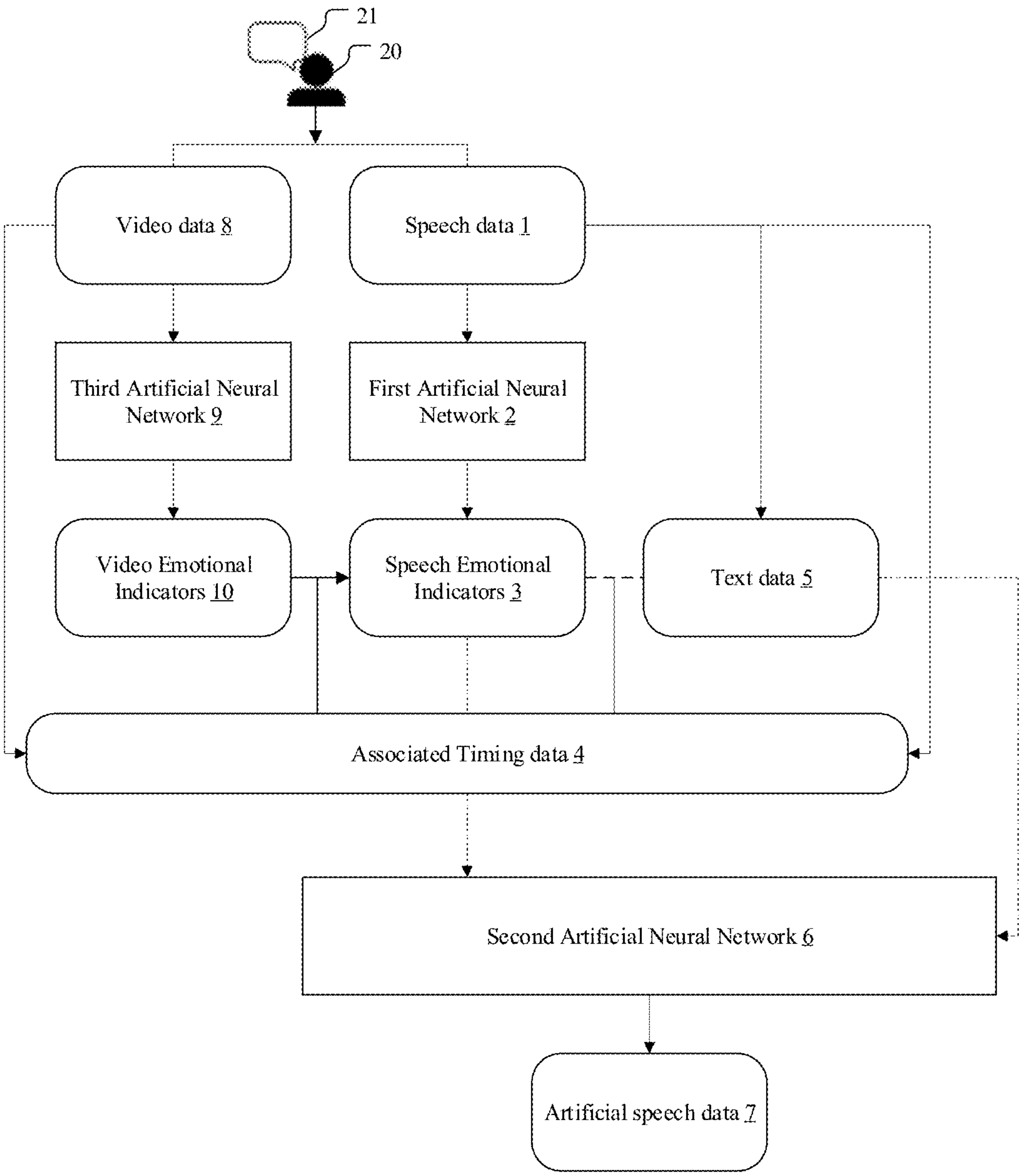
FIG. 2 is a diagram illustrating an embodiment to generate artificial speech data including emotional features based on audio data and video data which is implemented in an embodiment of an information processing device.

FIG. 2 illustrates a processing scheme to generate artificial speech data including emotional features based on audio data and video data. Speech data 1, which is audio data, and video data 8 of a speaker 20 are captured. The speech data 1 is provided to an artificial neural network 2 to extract speech emotional indicators. The video data 8 is provided to an artificial neural network 9 to extract video emotional indicators. The video emotional indicators 10 and the speech emotional indicators 3 are associated via associated timing data extracted from the speech data 1 and the video data 8.

For example, video emotional indicators and speech emotional indicators may fall into the same time interval, that is the acoustic event and the visual event from which the indicators are respectively extracted coincide in time. For example, an acoustic event may be a high pitch and a visual event may be a smile.

That is, if, for example, the speaker 50 speaks in a high pitch and smiles at the same time, both events, speaking in a high pitch and smiling, would coincide as they would fall into the same time interval. Based on the speech 51 of the speech data 1 a transcription of the speech 51 into text and thus text data 5 is generated. The associated timing data 4 is also associated with the text data 5. The speech emotional indicators 3 informed by the video emotional indicators 10 are associated with the text data 5 based on the associated timing data 4 and provided to a further artificial neural network 6. Based on the speech emotional indicators 3 and the text data 5 associated with each other via the associated timing data, the artificial speech data 7 is generated. Thus, as the artificial speech data 1 is based on speech emotional indicators 10, the artificial speech data 7 also includes an emotional component carried within the acoustic features.

The running of the second artificial neural network 6 can be executed by a circuitry of an information processing device (see 120, FIG. 4) configured to generate the artificial speech data 7. The second artificial neural network 6 may be implemented in one or more processors of the circuitry, e.g., processors such as the CPU 121 of FIG. 4.

Based on the artificial speech data 7 an artificial speech may be generated that carries an emotional component. The artificial speech may reproduce the speech 21 of the original speaker 20 in a different voice or if the text data 4 is based on a language translation of the speech 21, the artificial speech may reproduce the speech 21 of the original speaker 20 in a different language or even a different language and a different voice.

Figure 3:
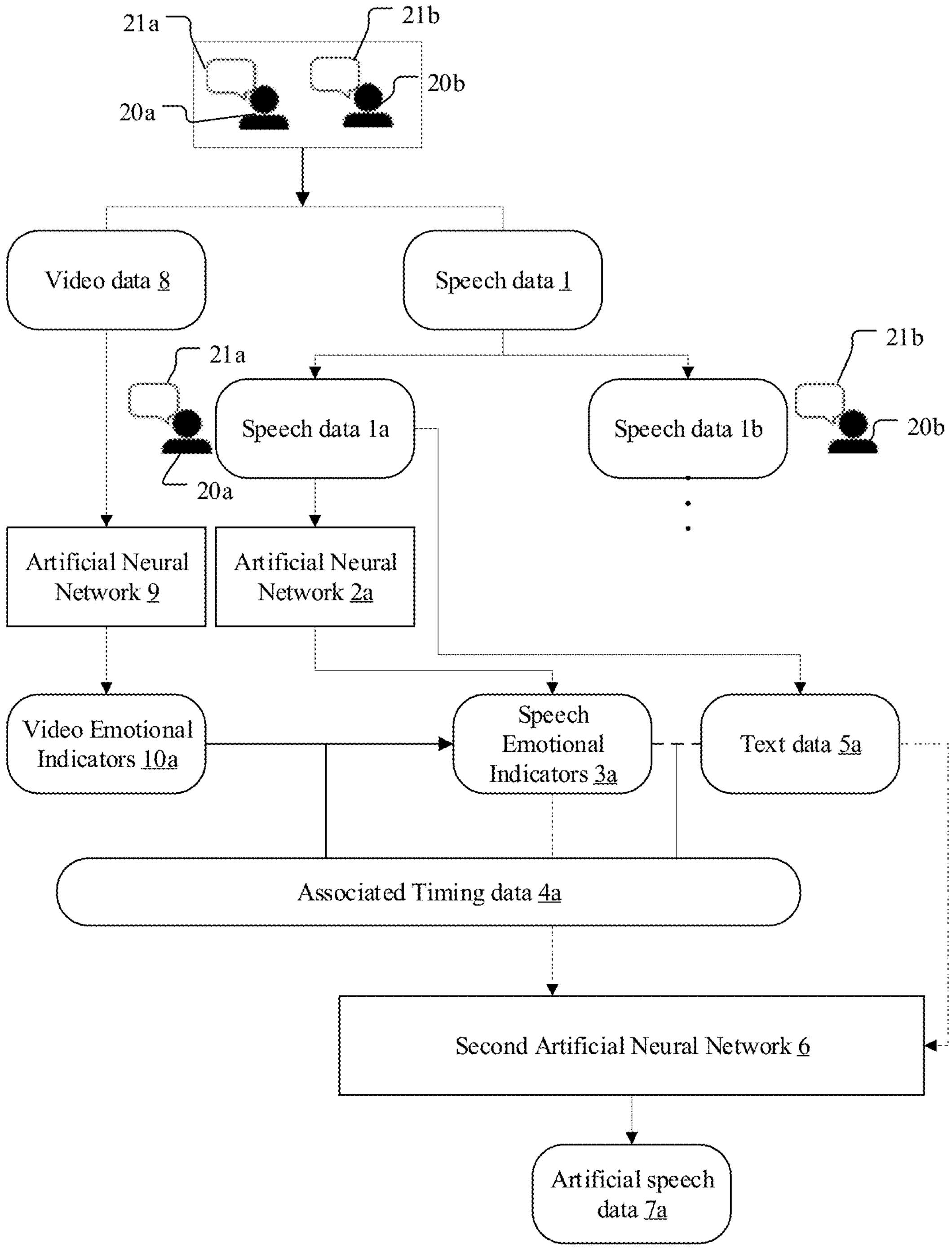
FIG. 3 is a diagram illustrating an embodiment to generate for generating artificial speech data based on speech data captured by multiple speakers which is implemented in an embodiment of an information processing device.

FIG. 3 illustrates an embodiment of an information processing device for generating artificial speech data based on speech data captured by multiple speakers. The embodiment of FIG. 3 implements the same process as described for FIG. 2, only instead of one speaker 20 (see FIG. 2) generating a speech 21 (see FIG. 2), the speech 21*a*, 21*b* of multiple speakers 20*a*, 20*b* is captured in audio and video format.

Thus, based on the video data 8 of the captured speakers 20*a* and 20*b*, the speech data 21*a* and 21*b* separated by speaker 20*a* and 20*b* is generated. Based on each speech data 21*a*, 21*b* separate text data, speech emotional indicators and video emotional indicators are obtained. For simplification only the process for generating the video emotional indicators 8*a*, according to speaker 20*a*, and the speech emotional indicators 3*a* as well as the text data 5*a* based on the speech data 1*a* and the associated timing data 4*a* according to speaker 20*a* is shown. Also, only the generation process of artificial speech data 7*a* based on speech data 1*a* is shown. But the processes are mirrored for speech data 1*b* of speaker 20*b*. Furthermore, the process after separating the speech data 1*a* and 1*b* by speaker 20*a*, 20*b* follows the process for speech data 1 of one speaker 20 as detailed above in the explanation regarding FIG. 2. Also, details regarding alternative embodiments are described in regard to FIG. 2 and also apply in regard to the processes of FIG. 3.

Figure 4:
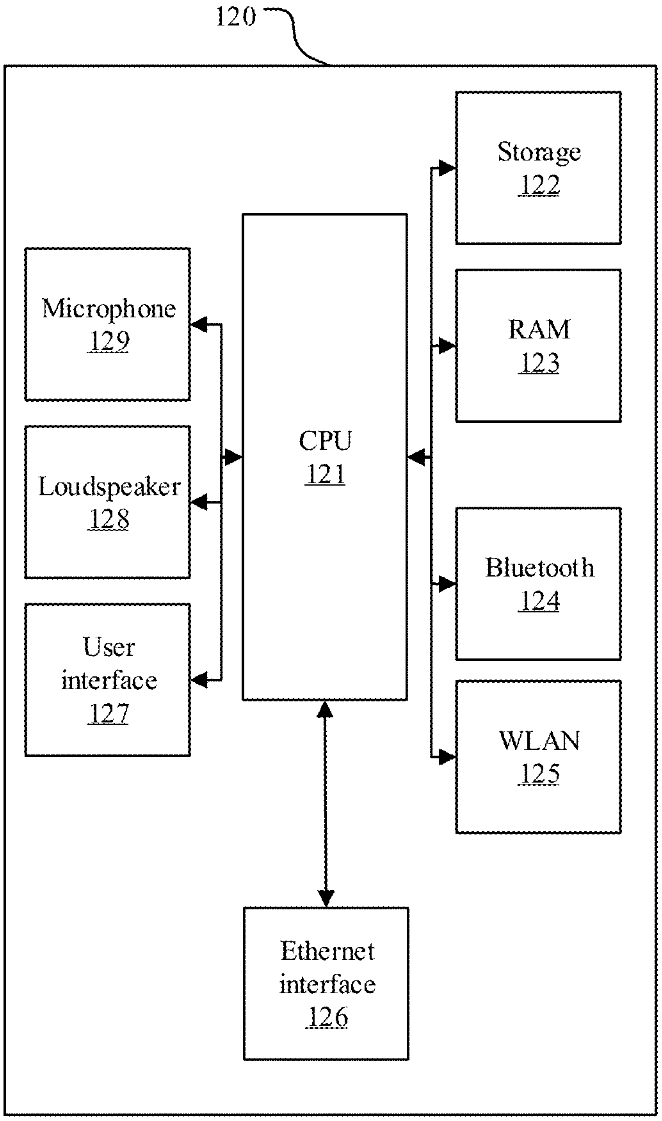
FIG. 4 illustrates a block diagram depicting an embodiment of an electronic device that implements generating artificial speech data.

FIG. 4 shows a block diagram depicting an embodiment of an electronic device that can implement the process of generating artificial speech data. The device 120 comprises a CPU 121 as processor. The device 120 further comprises a microphone 129 and a loudspeaker 128 connected to the processor 1201. The processor 121 may for example implement a second artificial neural network 6 that realizes the processes described with regard to FIGS. 1 to 3 in more detail. The loudspeaker 128 may be headphones, e.g., on-ear, in-ear, over-ear, wireless headphones and the like, or may consist of one or more loudspeakers that are distributed over a predefined space and is configured to render any kind of audio. The microphone 129 may be configured to receive any kind of audio signal.

The device 120 further comprises a user interface 127 that is connected to the processor 121. This user interface 127 acts as a man-machine interface and enables a dialogue between a user and the device. For example, a user may make configurations to the system using this user interface 127. The device 120 further comprises a Bluetooth interface 124, a WLAN interface 125 and an Ethernet interface 126. These units 124, 125, 1206 act as I/O interfaces for data communication with external devices. For example, additional loudspeakers, microphones, and cameras with WLAN or Bluetooth connection may be coupled to the processor 121 via these interfaces 124, 125 and 126.

The electronic device 120 further comprises a data storage 122 and a data memory 123 (here a RAM). The data memory 123 is arranged to temporarily store or cache data or computer instructions for processing by the processor 121. The data storage 122 is arranged as a long-term storage, e.g., for text data or speech data or video data as described in relation to FIGS. 1 to 3.

It should be noted that the description above is only an example configuration. Alternative configurations may be implemented with additional or other sensors, storage devices, interfaces, or the like.

The electronic device 120 may be a stationary electronic device, such as a laptop computer, a personal computer, or a mobile device of any other kind of portable or wearable device, for example, a smartphone, a tablet computer, smart glasses, head mounted displays (HMDs), earphones or other types of smart wearable devices, or the like.

Figure 5:
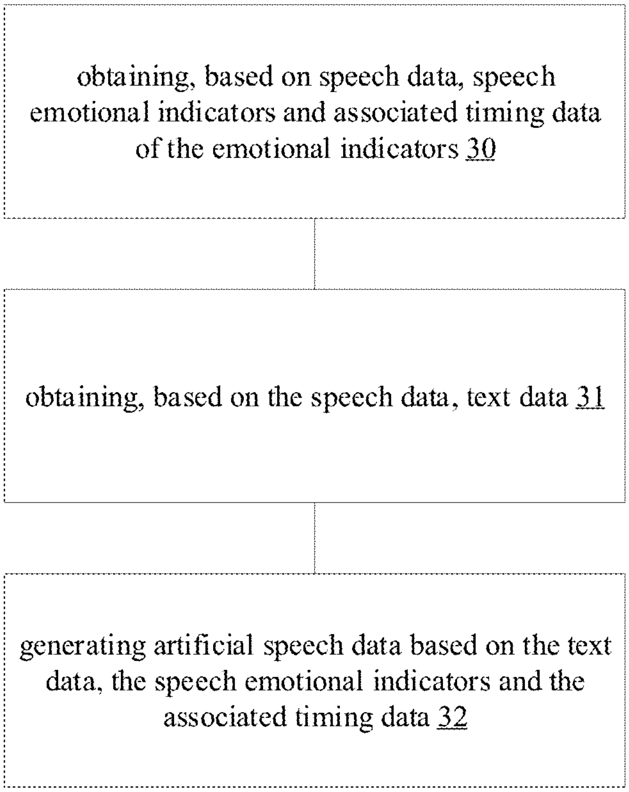
FIG. 5 illustrates an embodiment of a method for generating artificial speech data.

A method for controlling an electronic device, such as device 120 discussed above, is described in the following and under reference of FIG. 5.

At 30 speech emotional indicators and associated timing data of the emotional indicators are obtained based on speech data.

At 31 text data are obtained based on speech data.

At 32 artificial speech data based on the text data, the speech emotional indicators and the associated timing data is generated.

Figure 6:
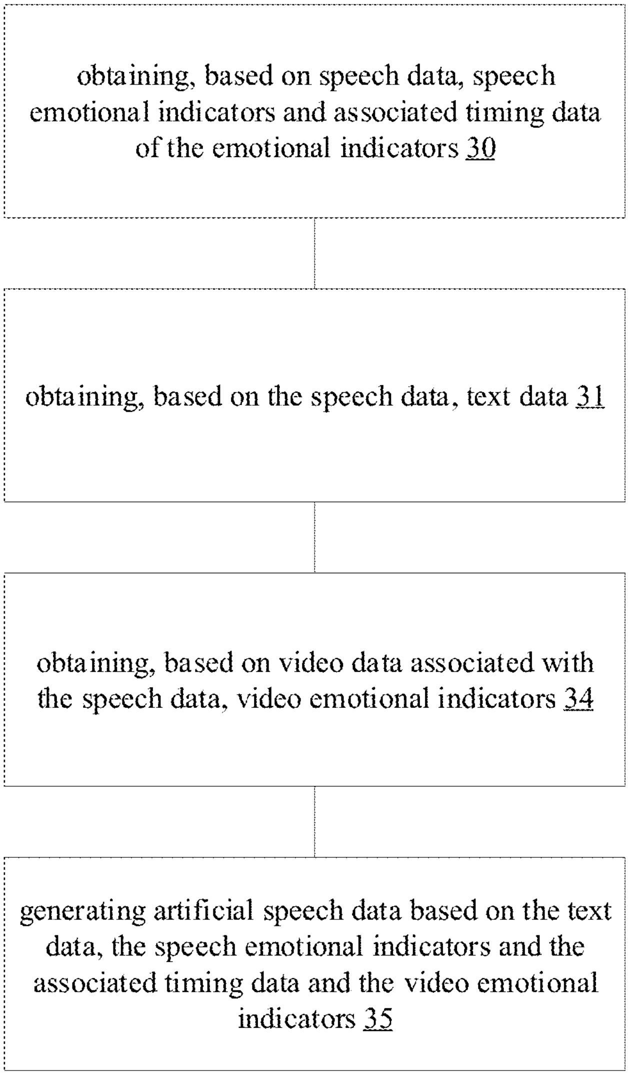
FIG. 6 illustrates an embodiment of a method for generating artificial speech data based on speech data and audio data.

Another embodiment of a method for controlling an electronic device, such as device 120 discussed above, is described in the following and under reference of FIG. 6.

At 30 speech emotional indicators and associated timing data of the emotional indicators are obtained based on speech data.

At 31 text data are obtained based on speech data.

At 34 video emotional indicators based on video data associated with the speech data are obtained.

At 35 artificial speech data based on the text data, the speech emotional indicators and the associated timing data and the video emotional indicators is generated.

The methods, as described with reference to FIGS. 5 and 6, can also be implemented as a computer program causing a computer and/or a processor, such as processor 121 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

It should be recognized that the embodiments describe methods with an exemplary ordering of method steps. The specific ordering of method steps is however given for illustrative purposes only and should not be construed as binding. For example, the ordering of 30 and 31 in the embodiment of FIG. 4 may be exchanged. Also, the ordering of 30, 31 and 34 in the embodiment of FIG. 5 may be exchanged. Other changes of the ordering of method steps may be apparent to the skilled person.

All entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing device for generating artificial speech data, comprising circuitry configured to:
  - obtain, based on speech data, speech emotional indicators and associated timing data of the emotional indicators;
  - obtain, based on the speech data, text data;
  - generate artificial speech data based on the text data, the speech emotional indicators and the associated timing data.

(2) The information processing device according to (1), wherein the speech emotional indicators are associated with the text data based on the associated timing data, and wherein the generation of the artificial speech data is based on the speech emotional indicators associated with the text data.

(3) The information processing device according to any one of (1) and (2), wherein the associated timing data are indicative of time intervals.

(4) The information processing device according to any one of (1) to (3), wherein the speech emotional indicators are obtained based on speech indicators of the speech data.

(5) The information processing device according to any one of (1) to (4), wherein the speech emotional indicators are at least one of: inferred emotion, speech tempo, speech pause, emotional pause, speech pitch, speech rhythm.

(6) The information processing device according to any one of (1) to (5), wherein the circuitry is further configured to:

obtain the speech emotional indicators based on an artificial neural network, which is configured to determine the speech emotional indicators based on the speech data.

(7) The information processing device according to any one of (1) to (6), wherein the generation of the artificial speech data is based on a trained speech generation model.

(8) The information processing device according to any one of (1) to (7), wherein the circuitry is further configured to:

obtain, based on video data associated with the speech data, video emotional indicators, wherein the generation of the artificial speech data is further based on the video emotional indicators.

(9) The information processing device according to (8), wherein the speech emotional indicators and the video emotional indicators are associated to each other, based on the associated timing data.

(10) The information processing device according to any one of (8) to (9), wherein the circuitry is further configured to synchronize the artificial speech data to visual indicators.

(11) The information processing device according to (10), wherein the visual indicators are lip movements, and the synchronization includes synchronizing the lip movements to the artificial speech data.

(12) The information processing device according to any one of (1) to (11), wherein the speech data is captured of a speaker.

(13) The information processing device according to any one of (8) to (11), wherein the speech data is captured of multiple speakers, and wherein the emotional speech indicators are obtained associated with each speaker based on the video data, and wherein the generation of the artificial speech is based on the speech emotional indicators associated with one speaker of the multiple speakers.

(14) An information processing method for generating artificial speech data, comprising:

obtaining, based on speech data, speech emotional indicators and associated timing data of the emotional indicators;

obtaining, based on the speech data, text data;

generating artificial speech data based on the text data, the speech emotional indicators and the associated timing data.

(15) The information processing method according to (14), wherein the speech emotional indicators are associated with the text data based on the associated timing data, and wherein the generation of the artificial speech data is based on the speech emotional indicators associated with the text data.

(16) The information processing method according to any one of (14) to (15), wherein the associated timing data are indicative of time intervals.

(17) The information processing method according to any one of (14) to (16), wherein the speech emotional indicators are obtained based on speech indicators of the speech data.

(18) The information processing method according to any one of (14) to (17), wherein the speech emotional indicators are at least one of: inferred emotion, speech tempo, speech pause, emotional pause, speech pitch, speech rhythm.

(19) The information processing method according to any one of (14) to (18), wherein obtaining the speech emotional indicators is further based on an artificial neural network, which is configured to determine the speech emotional indicators based on the speech data.

(20) The information processing method according to any one of (14) to (19), wherein the generation of the artificial speech data is based on a trained speech generation model.

(21) The information processing method according to any one of (14) to (20), further comprising:

obtaining, based on video data associated with the speech data, video emotional indicators, wherein the generation of the artificial speech data is further based on the video emotional indicators.

(22) The information processing method according to (21), wherein the speech emotional indicators and the video emotional indicators are associated to each other, based on the associated timing data.

(23) The information processing method according to (21) or (22), wherein the circuitry is further configured to synchronize the artificial speech data to visual indicators.

(24) The information processing method according to (23), wherein the visual indicators are lip movements, and the synchronization includes synchronizing the lip movements to the artificial speech data.

(25) The information processing method according to any one of (14) to (23), wherein the speech data is captured of a speaker.

(26) The information processing method according to any one of (21) to (24), wherein the speech data is captured of multiple speakers, and wherein the emotional speech indicators are obtained associated with each speaker based on the video data, and wherein the generation of the artificial speech is based on the speech emotional indicators associated with one speaker of the multiple speakers.

(27) A computer program comprising program code causing a computer to perform the method according to anyone of (14) to (26), when being carried out on a computer.

(28) A non-transitory computer-readable recording medium that stores therein a computer program product, which, when executed by a processor, causes the method according to anyone of (14) to (26) to be performed.

The invention claimed is:

1. An information processing device for generating artificial speech data, comprising circuitry configured to:
- obtain, based on speech data, speech emotional indicators and associated timing data of the emotional indicators;
- obtain, based on the speech data, text data;
- obtain, based on video data associated with the speech data, video emotional indicators comprising at least one of facial expressions, eye direction, gestures, and body pose;
- associate the speech emotional indicators and the video emotional indicators with the text data based on the associated timing data;
- encode the speech emotional indicators and the video emotional indicators into a synchronized latent feature space matched to timestamps of the text data:
- generate artificial speech data based on the synchronized latent feature space, the text data, the speech emotional indicators associated with the text data, the video emotional indicators associated with the text data, and the associated timing data.

2. The information processing device according to claim 1,
- wherein the speech emotional indicators are associated with the text data based on the associated timing data, and wherein the generation of the artificial speech data is based on the speech emotional indicators associated with the text data.

3. The information processing device according to claim 2,
- wherein the associated timing data are indicative of time intervals.

4. The information processing device according to claim 1,
- wherein the speech emotional indicators are obtained based on speech indicators of the speech data.

5. The information processing device according to claim 1,
- wherein the speech emotional indicators are at least one of: inferred emotion, speech tempo, speech pause, emotional pause, speech pitch, speech rhythm.

6. The information processing device according to claim 1, wherein the circuitry is further configured to:
- obtain the speech emotional indicators based on an artificial neural network, which is configured to determine the speech emotional indicators based on the speech data.

7. The information processing device according to claim 1, wherein the speech emotional indicators and the video emotional indicators are associated to each other, based on the associated timing data.

8. The information processing device according to claim 1, wherein the speech data is captured of a speaker.

9. The information processing device according to claim 1,
- wherein the speech data is captured of multiple speakers, and
- wherein the emotional speech indicators are obtained associated with each speaker based on the video data, and
- wherein the generation of the artificial speech is based on the speech emotional indicators associated with one speaker of the multiple speakers.

10. An information processing method for generating artificial speech data, comprising:
- obtaining, based on speech data, speech emotional indicators and associated timing data of the emotional indicators;
- obtaining, based on the speech data, text data;
- obtaining, based on video data associated with the speech data, video emotional indicators comprising at least one of facial expressions, eye direction, gestures, and body pose;
- associating the speech emotional indicators and the video emotional indicators with the text data based on the associated timing data;
- encoding the speech emotional indicators and the video emotional indicators into a synchronized latent feature space matched to timestamps of the text data; and
- generating artificial speech data based on the synchronized latent feature space, the text data, the speech emotional indicators associated with the text data, the video emotional indicators associated with the text data, and the associated timing data.

11. The information processing method according to claim 10,
- wherein the speech emotional indicators are associated with the text data based on the associated timing data, and wherein the generation of the artificial speech data is based on the speech emotional indicators associated with the text data.

12. The information processing method according to claim 11,
- wherein the associated timing data are indicative of time intervals.

13. The information processing method according to claim 10,
- wherein the speech emotional indicators are obtained based on speech indicators of the speech data.

14. The information processing method according to claim 10,
- wherein the speech emotional indicators are at least one of: inferred emotion, speech tempo, speech pause, emotional pause, speech pitch, speech rhythm.

15. The information processing method according to claim 10,
- wherein obtaining the speech emotional indicators is further based on an artificial neural network, which is configured to determine the speech emotional indicators based on the speech data.

16. The information processing method according to claim 10, wherein the speech emotional indicators and the video emotional indicators are associated to each other, based on the associated timing data.

17. The information processing method according to claim 10, wherein the speech data is captured of a speaker.

18. The information processing method according to claim 10,
- wherein the speech data is captured of multiple speakers, and
- wherein the emotional speech indicators are obtained associated with each speaker based on the video data, and
- wherein the generation of the artificial speech is based on the speech emotional indicators associated with one speaker of the multiple speakers.

* * * * *